United States Patent
Puppi et al.

(10) Patent No.: US 12,151,518 B2
(45) Date of Patent: *Nov. 26, 2024

(54) TYRE COMPRISING A MONITORING DEVICE

(71) Applicant: Pirelli Tyre S.p.A., Milan (IT)

(72) Inventors: Cristiano Puppi, Milan (IT); Ivan Gildo Boscaino, Milan (IT); Andrea Natta, Milan (IT); Marco Sabatini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 849 days.

This patent is subject to a terminal disclaimer.

(21) Appl. No.: 17/261,372

(22) PCT Filed: Jul. 25, 2019

(86) PCT No.: PCT/IT2019/050173
§ 371 (c)(1),
(2) Date: Jan. 19, 2021

(87) PCT Pub. No.: WO2020/026281
PCT Pub. Date: Feb. 6, 2020

(65) Prior Publication Data
US 2021/0276374 A1    Sep. 9, 2021

(30) Foreign Application Priority Data

Aug. 2, 2018 (IT) .......... 102018000007769
Dec. 4, 2018 (IT) .......... 102018000010794
Dec. 4, 2018 (IT) .......... 102018000010795

(51) Int. Cl.
*B60C 23/04*    (2006.01)

(52) U.S. Cl.
CPC ........ *B60C 23/041* (2013.01); *B60C 23/0493* (2013.01)

(58) Field of Classification Search
CPC ............ B60C 23/0408; B60C 23/0496; B60C 23/061; B60C 23/0494; B60C 23/0146;
(Continued)

(56) References Cited

U.S. PATENT DOCUMENTS

| 4,862,486 A | 8/1989 | Wing et al. |
| 5,749,984 A | 5/1998 | Frey et al. |

(Continued)

FOREIGN PATENT DOCUMENTS

| CN | 1714005 A | 12/2005 |
| CN | 1845831 A | 10/2006 |

(Continued)

OTHER PUBLICATIONS

Decision to Grant dated Oct. 26, 2021, from Russian Federal Service for Intellectual Property, in counterpart Russian Application No. 2021103559.

(Continued)

*Primary Examiner* — Andre J Allen
(74) *Attorney, Agent, or Firm* — Finnegan, Henderson, Farabow, Garrett & Dunner, L.L.P.

(57) ABSTRACT

The present disclosure is directed to a tyre with a monitoring device equipped with an electronic unit, an electric power supplier and an electrical connection between the electronic unit and the electric power supplier, wherein the electronic unit comprises a rigid printed circuits board on which a sensor is fixed to detect temperature, pressure and/or acceleration, a processing unit and a transceiver and wherein the electronic unit and the electric power supplier are both fixed on an inner surface of the tyre at the crown.

23 Claims, 8 Drawing Sheets

(58) Field of Classification Search
CPC . B60C 23/0433; B60C 23/0493; B60C 19/00; B60C 23/04; B60C 23/20; B60C 23/041; B60C 23/0462; B60C 23/0411; B60C 23/0444; B60C 23/0479; B60C 11/246; B60C 23/0488; B60C 23/064; B60C 11/24; B60C 23/007; B60C 23/062; B60C 23/0401; B60C 23/0413; B60C 23/06; B60C 23/043; B60C 23/0452; B60C 23/0467; B60C 23/0498; B60C 23/02; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/003; B60C 23/00318; B60C 23/0403; B60C 23/0472; B60C 23/04985; B60C 23/066; B60C 23/00372; B60C 23/0406; B60C 29/02; B60C 11/00; B60C 23/00; B60C 23/006; B60C 23/0454; B60C 23/044; B60C 23/0455; B60C 23/008; B60C 23/0461; B60C 23/0474; B60C 23/0483; B60C 23/0489; B60C 25/002; B60C 23/0415; B60C 23/0491; B60C 29/064; B60C 23/00363; B60C 23/0481; B60C 23/0459; B60C 23/0471; B60C 23/0476; B60C 11/0318; B60C 2200/02; B60C 23/002; B60C 2019/005; B60C 23/042; B60C 23/0477; B60C 23/0405; B60C 23/0422; B60C 23/0423; B60C 23/0437; B60C 23/0466; B60C 13/001; B60C 29/06; B60C 23/0447; B60C 25/132; B60C 23/0427; B60C 23/0449; B60C 25/00; B60C 9/18; B60C 23/065; B60C 23/0484; B60C 23/0486; B60C 13/00; B60C 19/003; B60C 23/00336; B60C 23/00345; B60C 23/08; B60C 17/00; B60C 2019/006; B60C 23/001; B60C 23/0445; B60C 25/142; B60C 17/02; B60C 29/00; B60C 5/004; B60C 11/0083; B60C 25/145; B60C 9/02; B60C 99/00; B60C 11/0332; B60C 23/0457; B60C 25/18; B60C 29/066; B60C 11/13; B60C 23/0418; B60C 23/0469; B60C 23/068; B60C 23/12; B60C 25/007; B60C 23/0432; B60C 25/005; B60C 25/138; B60C 5/14; B60C 11/03; B60C 23/005; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 2009/2038; B60C 2011/0374; B60C 2011/0388; B60C 2011/1213; B60C 2011/1231; B60C 2011/1245; B60C 2200/04; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 23/085; B60C 25/0548; B60C 25/185; B60C 7/105; B60C 7/107; B60C 9/22
USPC .................................................. 73/146–146.8
See application file for complete search history.

(56) References Cited

U.S. PATENT DOCUMENTS

| | | |
|---|---|---|
| 5,960,844 A | 10/1999 | Hamaya |
| 5,977,870 A | 11/1999 | Rensel et al. |
| 9,796,219 B2 | 10/2017 | Chong et al. |
| 10,960,714 B2* | 3/2021 | Decoster ............... B60C 23/064 |
| 11,780,276 B2* | 10/2023 | Puppi .................. B60C 23/0493 |
| | | 73/146 |
| 2004/0060629 A1 | 4/2004 | Willard, Jr. et al. |
| 2005/0076982 A1 | 4/2005 | Metcalf et al. |
| 2005/0110277 A1 | 5/2005 | Adamson et al. |
| 2006/0164250 A1 | 7/2006 | Kawai |
| 2007/0013503 A1 | 1/2007 | Chein et al. |
| 2007/0227644 A1 | 10/2007 | Fagot-Revurat et al. |
| 2008/0122707 A1 | 5/2008 | Fagot-Revurat |
| 2008/0303634 A1 | 12/2008 | Toyofuku et al. |
| 2009/0115591 A1 | 5/2009 | Mancosu et al. |
| 2009/0134710 A1 | 5/2009 | Tyndall et al. |
| 2009/0183562 A1 | 7/2009 | Brusarosco et al. |
| 2009/0188310 A1 | 7/2009 | Mancosu et al. |
| 2009/0218459 A1 | 9/2009 | Durif et al. |
| 2010/0007477 A1 | 1/2010 | Wilson et al. |
| 2010/0032066 A1 | 2/2010 | Nakao et al. |
| 2010/0097662 A1 | 4/2010 | Churilla et al. |
| 2010/0271191 A1 | 10/2010 | de Graff et al. |
| 2011/0315292 A1 | 12/2011 | Gougnaud |
| 2014/0118134 A1 | 5/2014 | Won |
| 2014/0326062 A1* | 11/2014 | Weston ................. B60C 23/064 |
| | | 73/146 |
| 2014/0352420 A1 | 12/2014 | Brusarosco et al. |
| 2015/0097662 A1 | 4/2015 | Yu et al. |
| 2015/0273956 A1 | 10/2015 | Biegner et al. |
| 2016/0317068 A1 | 11/2016 | Pepin et al. |
| 2017/0001483 A1 | 1/2017 | Sabatini et al. |
| 2017/0246915 A1* | 8/2017 | Besnoin ............... G01M 17/02 |
| 2017/0250633 A1 | 8/2017 | Moiraghi et al. |
| 2019/0193480 A1* | 6/2019 | Pulford ................ H01Q 1/2241 |

(56) References Cited

U.S. PATENT DOCUMENTS

| | | | |
|---|---|---|---|
| 2022/0016944 A1* | 1/2022 | Puppi | B60C 23/20 |
| 2023/0001753 A1* | 1/2023 | Natta | B60C 23/0493 |

FOREIGN PATENT DOCUMENTS

| | | | |
|---|---|---|---|
| CN | 1953881 A | | 4/2007 |
| CN | 1982098 A | | 6/2007 |
| CN | 101068691 A | | 11/2007 |
| CN | 101193764 A | | 6/2008 |
| CN | 101460320 A | | 6/2009 |
| CN | 101553373 A | | 10/2009 |
| CN | 101691103 A | | 4/2010 |
| CN | 102271932 A | | 12/2011 |
| CN | 203254901 U | | 10/2013 |
| CN | 104024005 A | | 9/2014 |
| CN | 105043428 A | | 11/2015 |
| CN | 106163835 A | | 11/2016 |
| CN | 107533982 A | | 1/2018 |
| DE | 195 32 914 A1 | | 3/1997 |
| DE | 102005016354 A1 | | 10/2006 |
| DE | 102005051136 A1 | | 5/2007 |
| DE | 102007014097 A1 | | 9/2008 |
| DE | 10 2012 007 071 A1 | | 10/2013 |
| DE | 102016222535 A1 | * | 5/2018 |
| FR | 2894519 A1 | | 6/2007 |
| JP | 2006-64565 A | | 3/2006 |
| JP | 2012-108152 A | | 6/2012 |
| RU | 2659120 C1 | | 6/2018 |
| WO | WO 2004/110794 A1 | | 12/2004 |
| WO | WO 2005/113262 A1 | | 12/2005 |
| WO | WO 2007/048621 A1 | | 5/2007 |
| WO | WO 2007/121768 | | 11/2007 |
| WO | WO 2011/051800 A1 | | 5/2011 |
| WO | WO 2013/098711 A1 | | 7/2013 |
| WO | WO 2013/098712 A1 | | 7/2013 |
| WO | WO 2016/042580 A1 | | 3/2016 |
| WO | WO 2018/065846 A1 | | 4/2018 |

OTHER PUBLICATIONS

International Search Report form the European Patent Office in corresponding International Application No. PCT/IT2019/050173 mailed Dec. 19, 2019.

Written Opinion of the International Searching Authority from the European Patent Office in corresponding International Application No. PCT/IT2019/050173 mailed Dec. 19, 2019.

Notice of Allowance issued by the China National Intellectual Property Administration on Jul. 14, 2022, in corresponding Application No. CN 201980051424.1 (6 pages).

Notification of Second Office Action issued by the China National Intellectual Property Administration on Aug. 3, 2022, in corresponding Application No. CN 201980051436.4 (8 pages).

Notification of the First Office Action issued by the China National Intellectual Property Administration on Sep. 2, 2022, in corresponding Application No. CN 201980051418.6 (7 pages).

European Office Action issued by the European Patent Office on Dec. 22, 2023, in corresponding Application No. EP 19 755 975.0 (5 pages).

* cited by examiner

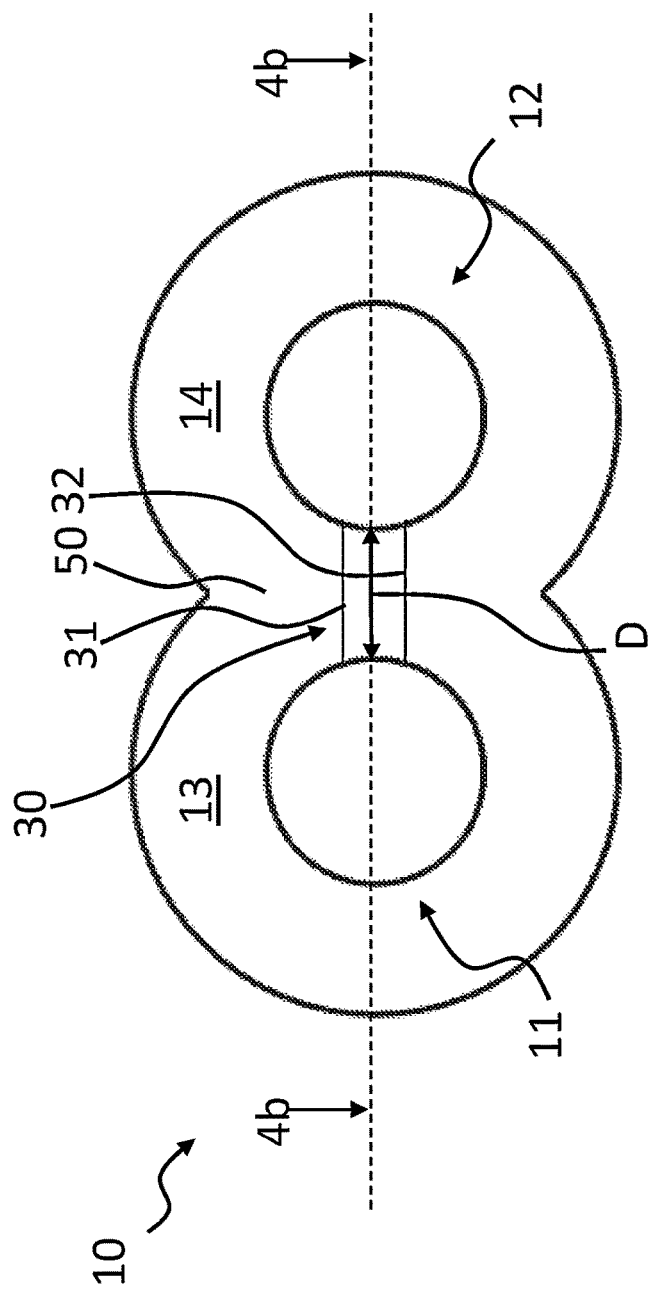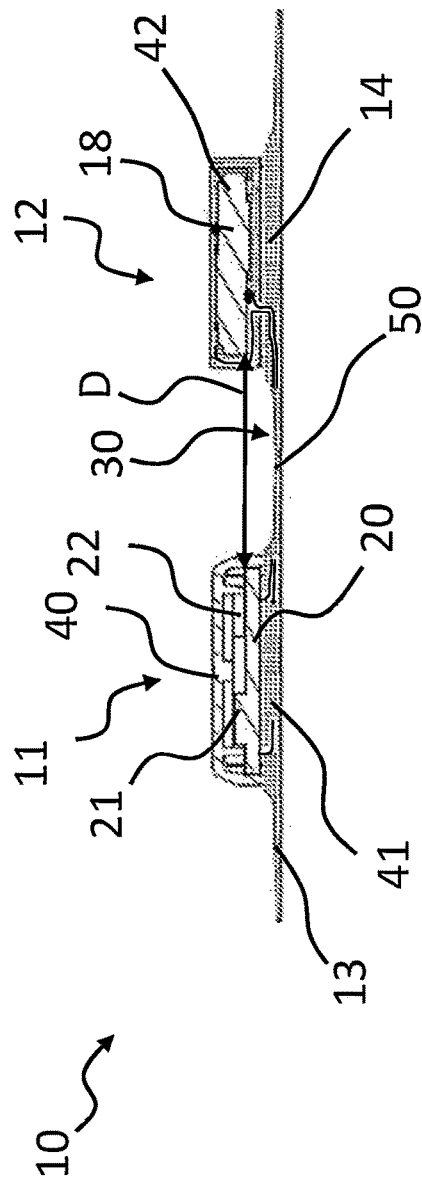

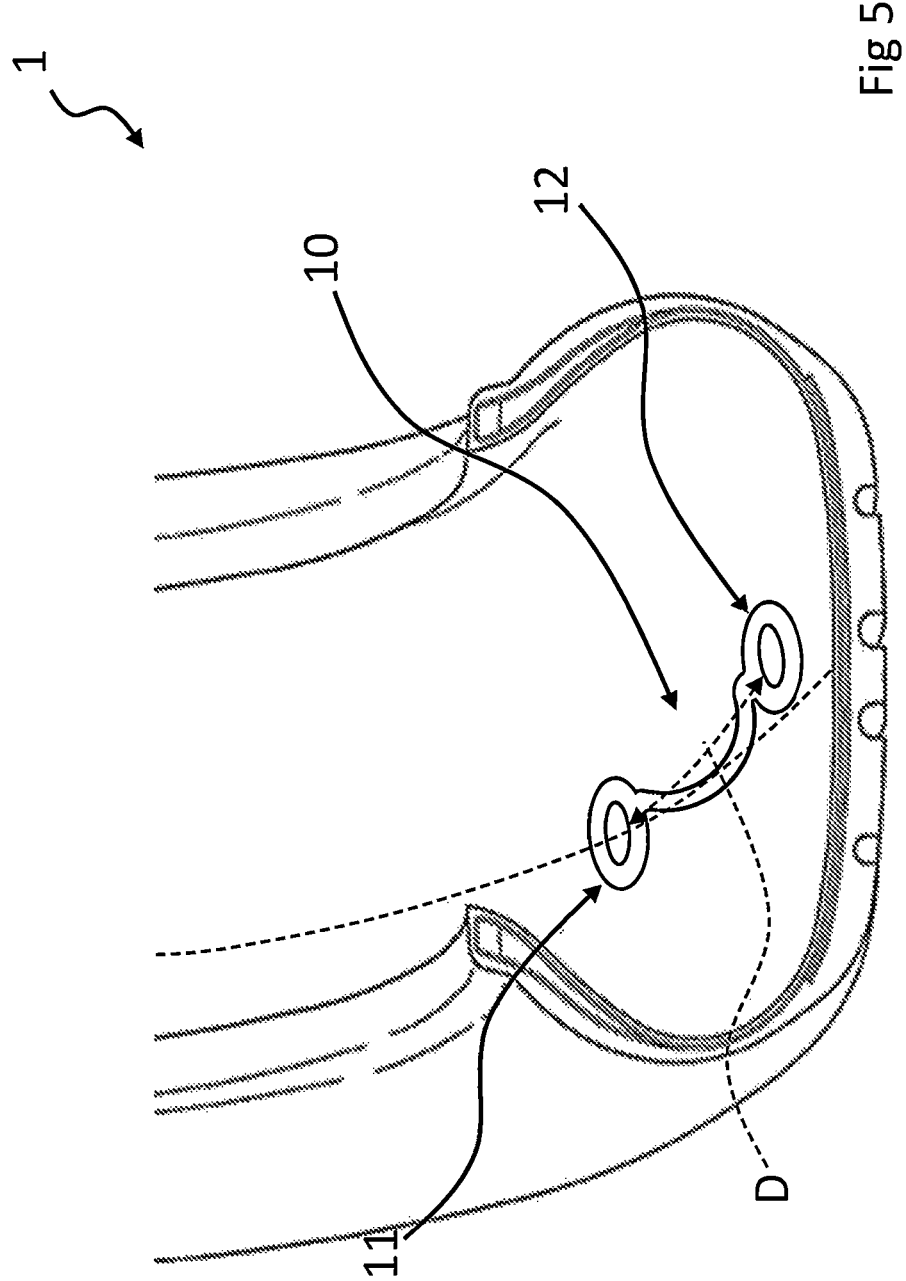

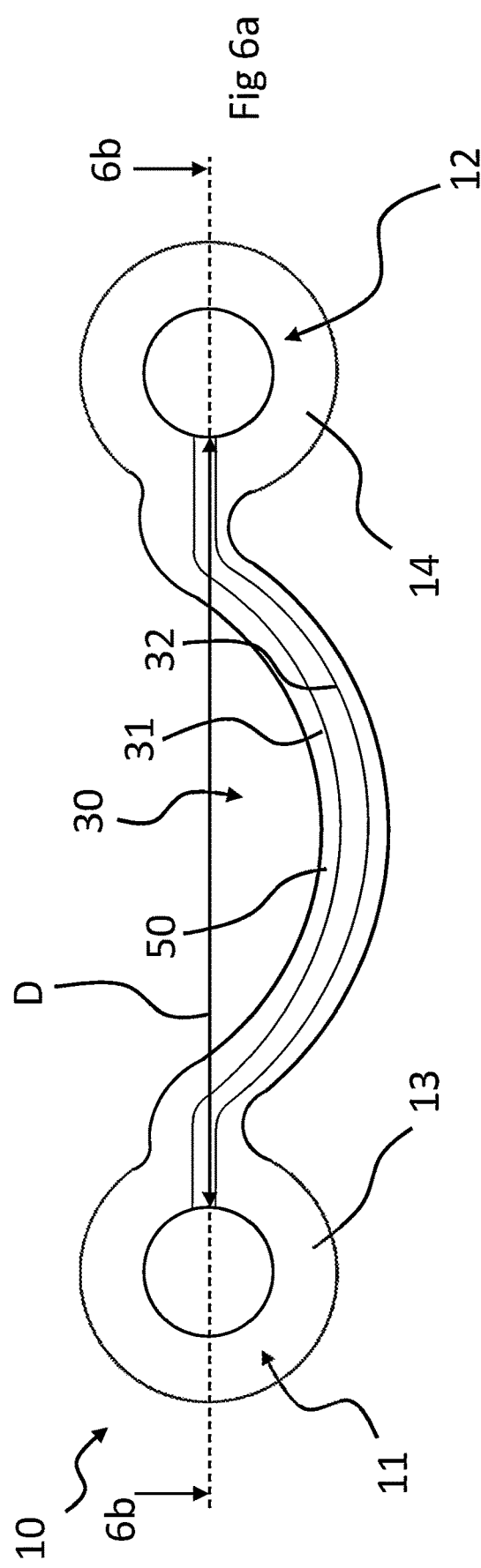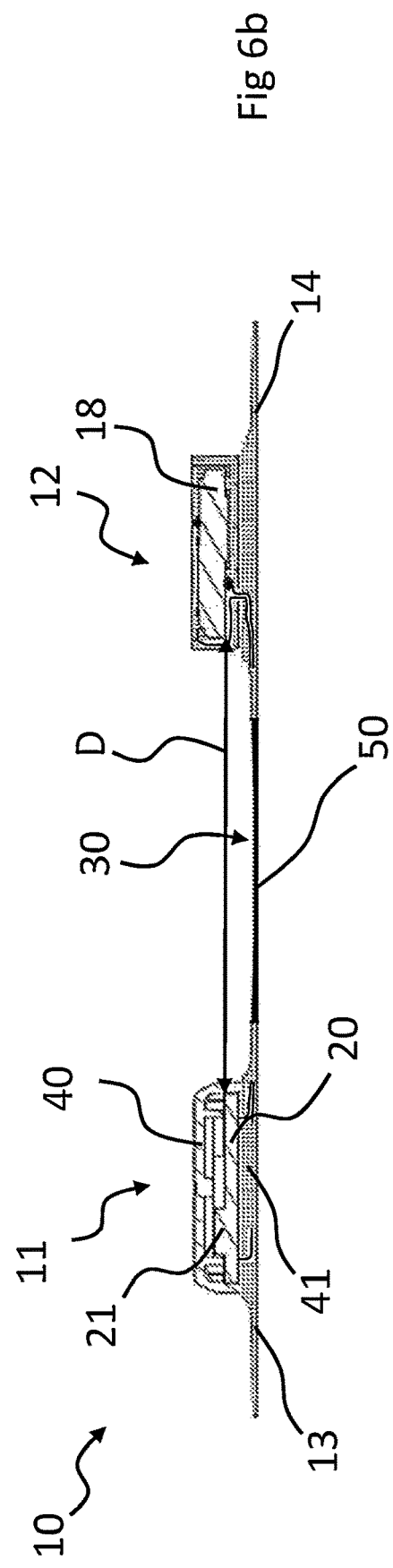

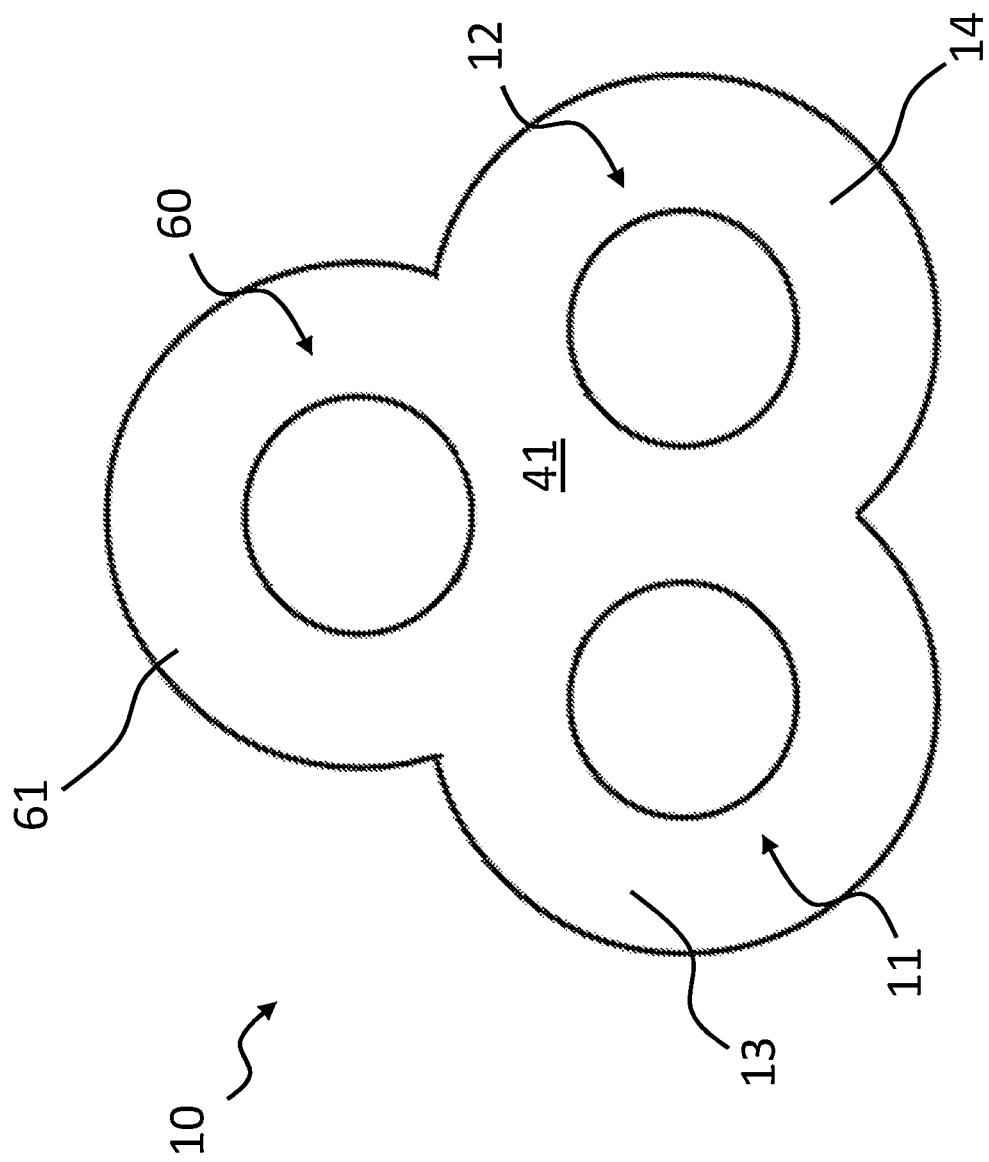

TYRE COMPRISING A MONITORING DEVICE

This application is a national stage entry application under 35 U.S.C. § 371 based on International Application No. PCT/IT2019/050173, filed Jul. 25, 2019, and claims priority to Italian Patent Application No. 102018000007769, filed Aug. 2, 2018, Italian Patent Application No. 102018000010794, filed Dec. 4, 2018, and Italian Patent Application No. 102018000010795, filed Dec. 4, 2018; the contents of each application is incorporated herein by reference.

TECHNICAL FIELD OF INVENTION

The present invention relates to a tyre comprising a monitoring device, for example suitable for monitoring at least one physical quantity among temperature, pressure and acceleration.

STATE OF THE ART

Typically a tyre has a substantially toroidal structure around an axis of rotation of the same during operation, and it has an equatorial plane orthogonal to the axis of rotation, said equatorial plane being typically a plane of (substantial) geometric symmetry (e.g. ignoring any minor asymmetries, such as the tread design and/or the writing on the sides and/or the internal structure).

With "inner cavity" it is meant the space delimited by the inner surface of tyre and by the surface of the rim facing towards the inner surface of the tyre, when mounted.

With 'crown portion' it is meant the portion of tyre placed at the tread band.

The terms "radial" and "axial" are used with reference respectively to a direction perpendicular and to a direction parallel to the rotation axis of the tyre.

The term "tangential" is used with reference to a direction generally oriented according to the rolling direction of the tyre, perpendicular to both the radial direction and the axial direction.

With "footprint" it is meant the portion of outer surface of the tread band which, during the rolling of the tyre mounted and subjected to a load (for example due to effect of the mounting under a vehicle), at each instant is in contact with the rolling surface.

The footprint typically has substantially null curvature (or substantially infinite curvature radius), or in any case substantially assumes the conformation of the rolling surface. With "footprint portion" it is meant the part of the crown portion corresponding to the footprint.

There have been proposed tyres for vehicles comprising monitoring devices of one or more physical quantities arranged in the inner cavity of the tyre, for example as described in US 2014/0118134 A1; U.S. Pat. Nos. 4,862,486; 5,749,984; 5,960,844; 5,977,870; US 2008/0303634 A1; US 2009/0134710 A1; US 2010/0007477 A1, DE102012007071 A1, WO2007/121768 A1, WO2007/048621 A1, WO2013/098711 A1, WO201/098712 A1, WO2018/065846 A1.

SUMMARY OF THE INVENTION

In the context of tyres comprising monitoring devices arranged in the inner cavity of the tyre, the Applicant has made the following considerations.

It is preferable to monitor the desired physical quantity, in particular the temperature and the acceleration, directly on, or near to, the inner surface of the tyre at its crown portion. For example, it is preferable to acquire the temperature near to the inner surface of the crown portion, since in this way it is substantially acquired the actual temperature of the tyre material in the area in which the greatest stresses develop which tend to heat the tyre during rolling. On the contrary, the temperature for example near to the rim or the temperature of the fluid present in the inner cavity can be very different from the temperature of the inner surface of the crown portion. Moreover, when the temperature is obtained, for example near to the rim or the inflation valve, the data measured is influenced by the temperature of the environment outside the wheel due to the heat conduction and/or the presence of external heat sources such as air flows from the radiators or the brake discs.

In the case of the acceleration, it is preferable a direct measurement of at least one of the radial, tangential and axial components of the acceleration undergone by an arbitrary point located on the inner surface of the crown which is subjected to stress and deformation due to the cycle of entry and exit from the footprint, or more in general from the interaction between the tyre and the rolling surface. In this way it is possible to obtain information from the monitored acceleration signal about the state and/or the instantaneous behaviour of the tyre during use (e.g. size of the footprint, wear, hydroplaning, slipping, etc). Therefore, it is desirable to apply the acceleration sensor to a point close to where the stresses are generated, i.e. close to the contact between the tyre and the rolling surface, such as typically a point on the inner surface of the crown portion.

For the realization of the monitoring device it is preferable to use a PCB ('Printed Circuit Board') technology, based on a rigid support, on which the circuit tracks are printed and the electronic components welded through the respective electrical connections (called "pin"). Through the aforesaid welding, electrical and mechanical connections are made between the various electric and electronic components and the rigid support, i.e. the PCB. According to the Applicant, the PCB technology is a consolidated technology and, therefore, easily available, cheap and reliable. Moreover, this technology has reached remarkable levels of integration between components, miniaturization and lightening. A PCB comprising active and passive electronic components, such as for example a sensor of at least one of pressure, temperature and acceleration, a microprocessor that generates a signal containing the data detected by the sensor, a transceiver for wireless transmission of the monitoring signal and/or the monitored data and for possibly receiving control signals, in addition to passive components such as resistors, inductors, capacitors, etc, can be configured to weigh a few grams (for example 3-5 g).

However, the use of this technology involves a concentration of the mass of the PCB and of the components thereon welded to a point located on the tyre.

Moreover, for the operation of the monitoring device it is usual to provide an accumulator/generator of electric power. For example, typically a battery (e.g. coin cell) is used. This accumulator/generator of electric power typically has a significant weight (not less than further 3-4 g in the case of batteries with sufficient power available for a period compatible with the life of the tyre and not rechargeable).

The prevalent trend is to make the overall monitoring device as compact as possible. For example, an advantageous solution provides to overlap between each other the battery and the PCB, suitably connected, and to encapsulate the whole inside an encapsulating material (e.g. polymeric resin), possibly in a rigid containment body. Furthermore, it can be provided a housing (for example made of elastomeric material) to couple the device to the surface of the tyre. The coupling can be done through an attachment patch to the surface of the tyre and/or one or more adhesives. The set of these structures (containment body, encapsulating material, housing, adhesive/s) entails a further weighting, for an overall weight of the entire monitoring device that can reach 10-15 g, almost all located in a small area, equal to the plan area of the container (for example inscribed in a circle with diameter of 20-30 mm).

Generally, it is believed that the aforesaid overall weight of the monitoring devices with PCB technology is small enough not to create problems to the monitoring device in terms of gluing and/or of structural and functional integrity of the monitoring device thereof, as well as structural and functional integrity of the tyre, following the generated stresses. In other words, the forces generated during rolling are generally considered bearable, including the forces generated by the centripetal/centrifugal (radial) and shear (tangential) acceleration generated each time the monitoring device enters and exits into the footprint portion of the tyre and which stress the structures of the tyre, the monitoring device and/or the adhesive.

The Applicant, however, in conducting tests at very high tyre rotation speeds (corresponding to linear extreme speeds of a corresponding motor-vehicle, for example over 300 km/h) has verified that the localization of the aforesaid mass, however small, generates very intense stresses (in particular radial and tangential stresses).

FIG. 8 shows a comparative monitoring device 200 with respect to the present invention in which a battery 18 and a rigid board 20 (to which the electronic components are fixed) are radially overlapped on each other, going to burden with the whole of their weight in the same point of the crown portion of the tyre. For example, the containment body 40 has a diameter of about 25 mm, while the attachment portion 201 to the tyre (made in one piece with an encapsulating material 41) has a diameter of about 55 mm; outside the central portion 210 contained within the dotted line and having the aforesaid diameter of 25 mm, it has a negligible flexional rigidity while it maintains an elongational rigidity sufficient to distribute on the surface of adhesion to the tyre the shear stresses which are generated into footprint. The central portion 210 is considered rigid for the purposes of the considerations and of the calculations that follow. The overall weight of the device 200, in the example considered, is equal to about 12 g, divided between about 10 g of weight for the central portion 210 and about 2 g for the annular portion of the attachment portion 201 outside the central portion 210.

With this device, the Applicant has performed an indoor test on a tyre having an inner circumferential development of 2036 mm. The device 200 was glued through an adhesive (468MP7c marketed by the 3M) to the inner surface of the tyre. The tyre, mounted on a wheel rim and subjected to a load that simulated the use on a motor vehicle, was subjected to increasing in time rotation speeds. The Applicant has found that at linear speeds above 300 km/h the temperature detected by the sensor of the device 200 underwent a rapid increase, which caused the interruption of the operation of the monitoring device. According to the Applicant, such rapid increase of temperature is caused by a loss of structural integrity of the monitoring device, for example at the adhesive and/or the components.

In fact, in the areas of entry and exit from the footprint, due to the corresponding deformation undergone by the tyre, the radial acceleration is greater than the areas outside the footprint. By experimental measurements, carried out by the Applicant at different speeds, the maximum acceleration at the footprint entry and exit is equal to about 1.5 times the radial acceleration outside the footprint. Moreover, in the footprint area, while the radial acceleration is nullified, a tangential acceleration appears, which follows, along the footprint, a pattern similar to a sinusoid, which amplitude has been experimentally determined by the Applicant to be equal to about the half of the radial acceleration at the footprint entry/exit.

According to the Applicant, the acceleration with its rapid and intense variation on high frequency cycles generates significant cyclic stresses, in the radial direction (such as a 'hammering') and in the tangential direction (shear), caused by the mass of the monitoring device on the structures of the tyre and/or vice versa. At the aforesaid extreme speeds these stresses have as direct consequence a significant and localized overheating of the monitoring device and/or of the tyre at the positioning point of the monitoring device. Said overheating and said mechanical stress and/or the combination of the two effects may lead to a damage of the monitoring device, relatively to its structural and/or functional integrity, and/or to its coupling with the inner surface of the tyre (e.g. separation and/or disconnection of the adhesive for applying the device to the inner surface). In more serious cases, said overheating and said mechanical stress and/or the combination of the two effects can lead to the loss of structural integrity of the crown portion of the tyre, even to the formation of holes (so-called "blisters") at the tread band, caused by the localized separation of the tyre compound subsequently removed due to the rotational movement of the latter and/or to the delamination of the tread, in particular of its central rib.

According to the Applicant, the rapid increase of temperature observed during the aforesaid indoor test may be caused by the loss of structural integrity of the monitoring device and/or of the adhesive, which in turn has induced an increase of the cyclic deformation of the adhesive and/or of other parts of the monitoring device. This could in turn have triggered the observed overheating.

The Applicant has therefore faced the problem of realizing a monitoring device of at least one physical quantity (for example temperature, and/or pressure and/or acceleration) to be arranged directly close to the inner surface of the crown portion of a tyre, highly reliable and able to avoid or limit localized overheating and the consequent risk of loss of structural integrity of the tyre and/or of the monitoring device, even at very high rotational speeds of the tyre.

According to the Applicant the aforesaid problem is solved through a monitoring device having electronic unit (comprising PBC, sensor/s, processing unit, transceiver) and electric power accumulator/generator electrically connected to each other but separated, and fixed to a mutual distance on the inner surface of the tyre by means of respective supports.

According to an aspect the invention relates to a tyre comprising a monitoring device. The monitoring device comprises an electronic unit and an electric power supplier.

The monitoring device comprises moreover a first support and a second support. The electronic unit and the electric power supplier are both fixed on an inner surface of said tyre at a crown portion of said tyre through respectively said first and second support.

The electronic unit comprises: a rigid printed circuit board (PCB); at least one sensor for detecting at least one of the following physical quantities: temperature, pressure, acceleration; a processing unit; a transceiver. Said at least one sensor, said processing unit and said transceiver are fixed on said rigid board.

The monitoring device comprises an electrical connection for electrically connecting said electronic unit to said electric power supplier.

With 'electric power supplier' it is meant a component structured to supply electric power, either in which the power supplied is pre-accumulated (such as in the accumulators, e.g., the batteries or the capacitors) or the power supplied is generated and/or received in situ in real time (such as in the power recovery devices, or 'energy harvesting' devices, coupled or not with energy accumulators).

The presence of the first and second support which respectively fix the electronic unit and the electric power supplier on the inner surface of the tyre causes that the electronic unit and the electric power supplier are placed mutually side by side on the inner surface, adjacent to each other or at a mutual distance having development on the inner surface of the tyre (i.e. having at least one axial and/or circumferential component). In other words, the two devices are not—even partially—radially overlapped to each other. According to the Applicant this solution causes the overall mass of the monitoring device to be divided into at least two parts, each part having a non negligible mass with respect to the overall mass of the device. In this way the mass which insists, with the consequent aforesaid hammering and shear stress phenomenon, on a respective single localized portion of the tyre crown is reduced: this entails a reduction of the consequent overheating of the crown portion and/or of the adhesive and/or of the monitoring device.

The present invention can have one or more of the following preferred features.

Typically, the rigid board is inscribed in a circle with a diameter less than or equal to 50 mm, more preferably less than or equal to 40 mm, even more preferably less than or equal to 30 mm. In this way the electronic components of the electronic unit are spatially concentrated, in order to miniaturize the electronic unit itself. Nevertheless, the division of the device into (at least) two parts according to the present invention mitigates the increase of the aforesaid cyclic stress consequent to the spatial localization of the masses.

Typically, the rigid board comprises a laminated layer comprising one or more layers of a core material, such as cellulose sheets (e.g. paper), fiberglass (woven or not), etc, impregnated with a resin (e.g. phenolic, epoxy, polyimide, or BT/epoxy), and electrically conductive metal tracks. Preferably said at least one sensor, said processing unit and said transceiver are fixed by welding on said metal tracks. This technology, widely consolidated, offers great reliability and prompt availability. The use of this technology in the aforesaid context of extreme speeds (e.g. 300 km/h or more) is made possible thanks to the present invention, because the division of the device into (at least) two parts mitigates the increase of the effect of the stresses consequent to the weight of the epoxy rigid board and of the tracks and welds.

Preferably the laminated layer comprises one or more layers of woven fiberglass impregnated with epoxy resin, to give resistance at high temperature (above 100° C.).

Preferably a distance between the electronic unit and the electric power supplier is greater than or equal to 50 mm, more preferably is greater than or equal to 60 mm, even more preferably is greater than or equal to 70 mm. With 'distance' it is meant the length of the shortest line on the inner surface of the tyre (in the undeformed state) connecting the edges of the electronic unit (e.g. the edges of the rigid board) and of the electric power supplier (e.g. the edges of a container of the electric power supplier or, in its absence, the edges of a component or of a part of the supplier nearest to the electronic unit).

The Applicant has observed that the temperature distributions (determined by the heating phenomenon due to the cyclic stresses of entry/exit from the footprint and by the phenomenon of the propagation of the produced heat) individually associated respectively to the electronic unit and to the electric power supplier are spatially substantially decoupled from each other, so that an accumulation of localized heat is avoided. In other words, the electronic unit and the supplier are sufficiently far to prevent that the tyre material is subjected to an excessive local overheating phenomenon due to the combination of the two contributions of the single devices.

Preferably said distance between the electronic unit and the electric power supplier is less than or equal to 250 mm, more preferably less than or equal to 200 mm, even more preferably less than or equal to 150 mm. In this way the mutual displacement between the two devices, which could result in a very long line of mutual electric connection, with consequent complications in terms of manufacturing, coupling (gluing) with the tyre, structural resistance of the circuits and/or of their support, weight and/or encumbrance, is limited.

Preferably the equatorial plane of the tyre intersects at least one of said first and second support (preferably said first support), more preferably in median position. In this way the application of the device in a portion of the tyre subjected to the greatest stresses and—therefore—of greater interest in case of signals measurements from which to monitor information on the state and/or on the instantaneous behaviour of the tyre during use, is made easy.

In an embodiment, a straight line passing through the centres of mass of the electronic unit and of the electric power supplier intersects a direction parallel to the equatorial plane of the tyre with an angle less than or equal to 10°, preferably less than or equal to 5°, more preferably it lies substantially on said equatorial plane (i.e. it is circumferentially orientated). In this way both electronic unit and the electric power supplier are subjected (in sequence) to the same stresses type, with significant simplification in terms of design.

In another embodiment, a straight line passing through the centres of mass of the electronic unit and of the electric power supplier intersects a direction parallel to the equatorial plane of the tyre with an angle greater than or equal to 5°, more preferably greater than or equal to 10°. In this way the electronic unit and the power supplier are circumferentially misaligned and the variation of their distance following the deformation of the crown portion during the cycle of entry/exit from the footprint portion is reduced with respect to the case with circumferential alignment. Moreover, in this way it is possible for example to place the electronic unit on the equatorial plane, as described above, and the electric power supplier (which can be damaged when overheated) outside the equatorial plane (e.g. outside the central rib of the tread), i.e. at a point less stressed than the equatorial plane.

Preferably said at least one sensor is suitable for detecting at least two of the following physical quantities: temperature, pressure, acceleration, for example temperature and pression. Even more preferably said sensor is suitable for detecting all three of the said physical quantities. Preferably said at least one sensor is suitable for detecting at least said acceleration, more preferably at least a radial component and/or a tangential component of said acceleration. In this way the monitoring device provides particularly useful data for obtaining the state and/or operation of the tyre, and/or the behaviour of the vehicle on which it is mounted.

Typically said electric power supplier is an electric energy accumulator, more preferably comprises a battery, for example a coin cell battery.

Typically said electrical connection comprises at least one electric path, preferably at least two separate electric paths (one for the connection to the positive pole and one for the connection to the negative pole of the electric power supplier).

Preferably the monitoring device comprises a third support through which said electrical connection (e.g. said electric path/s) is fixed on the inner surface of the tyre at the crown portion. In this way the overall device remains adherent to the inner surface.

Said first support and/or said second support comprise an adhesive layer. The electronic unit and/or the electric power supplier can be directly fixed on the inner surface of the tyre through a respective adhesive layer (which therefore acts as first and/or second support respectively).

Preferably, said first support and/or said second support comprises/comprise a respective attachment portion, flexible and preferably substantially inextensible and a respective adhesive layer (e.g. an adhesive pressure sensitive) which keeps each attachment portion glued to the inner surface of the tyre. In this way, the monitoring device can mostly adapt to the deformation of the crown portion during the rolling, in particular at the footprint. Furthermore, it is possible to distribute shear stresses on a wider area.

Preferably said attachment portion is selected from the following group: a piece of elastomeric material, a film of plastic material, such as nylon, PET, PEN or polyimide, and a polyurethane layer. Preferably, the attachment portion is reinforced (to improve its resistance to extensibility) with textile and/or metallic filaments.

Preferably said third support comprises a substrate, more preferably flexible (e.g. in polyurethane). In this way the monitoring device, even for significant distances between the first and second support, can deform according to the deformation undergone by the crown portion during the rolling, in particular at entry/exit from the footprint.

Preferably an overall development of said third support, and/or of said electrical connection, from said electronic unit to said electric power supplier is greater than said mutual distance between the electronic unit and the electric power supplier. In this way the third support, and/or the electric paths of the electrical connection, have an excess of length which can comply with a possible mutual displacement of the two devices caused by the deformation of the crown portion during the rolling.

Preferably said electrical connection (e.g. said electric path or said two electric paths) is made by a conductive ink deposited on said third support (e.g. on said substrate), more preferably on a surface of said substrate facing said inner surface of the tyre. Alternatively, or in combination, said electric paths can be made as elongated metallic conductive elements, wherein the electrical connection comprises, more preferably, an elastomeric resin (e.g. based on a polyurethane elastomer) which incorporates said conductive elements, more preferably in single piece with said third support.

Preferably said conductive elements are made of copper.

Preferably said third support comprises an adhesive layer, for example an adhesive pressure sensitive, interposed between said inner surface of the tyre and said substrate, more preferably said electrical connection being interposed between said adhesive layer and said substrate.

Preferably said at least one sensor, said processing unit and said transceiver are all fixed on a first side of said board.

Preferably said electronic unit comprises a containment body (more preferably rigid) which at least partially houses said board, said at least one sensor, said processing unit and said transceiver.

Preferably said first side of the board faces a bottom wall of said containment body. Preferably an encapsulating material (preferably a polyurethane or a polyurea material, more preferably an elastomeric polyurethane material, preferably based on polyether) encapsulates said electronic unit, more preferably inside said rigid container.

Preferably said encapsulating material can be localized (only) on a second side of the board, opposite to the first side. In this way a free gap is left on the first side, the one of the active components, to allow the correct operation of the sensor (e.g. of pressure) and/or of the transceiver.

Preferably said encapsulating material encapsulates with continuity said electric power supplier.

Preferably said encapsulating material realizes said first and/or second support (e.g. it realizes said respective attachment portion), preferably with continuity with the material respectively encapsulating the electronic unit and/or the electric power supplier. In this way the need of a separate housing and/or of a coupling between the electronic unit and/or the electric power supplier and the respective supports is avoided.

Preferably said encapsulating material realizes also said third support in a single body (e.g. it realizes said substrate).

Typically said electronic unit has an overall weight greater than or equal to 2 g.

Preferably, said electronic unit has an overall weight less than or equal to 8 g, more preferably less than or equal to 6 g. Typically said electric power supplier has an overall weight greater than or equal to 2 g. Preferably, said electric power supplier has an overall weight less than or equal to 8 g, more preferably less than or equal to 6 g. With 'overall weight' of a given element it is meant its total weight, for example considering all the active and passive components, the possible container, the encapsulating material, etc.

In a preferred embodiment, the monitoring device comprises at least one further electric power supplier. The monitoring device can comprise a fourth support, the further electric power supplier being fixed on the inner surface of said tyre at the crown portion through said fourth support. Said fourth support is placed at a respective distance from said first and second support having development on said inner surface of the tyre.

In this embodiment, the monitoring device comprises a further electrical connection for electrically connecting said electronic unit with said further electric power supplier. The further electric power supplier can be fixed directly on the inner surface of the tyre through a respective adhesive layer (which therefore acts as fourth support) or, preferably, said fourth support comprises a respective attachment portion, flexible and substantially inextensible, having a respective adhesive layer for the attachment on the inner surface of the tyre.

Preferably the aforesaid encapsulating material realizes with continuity also said fourth support (e.g. it realizes said respective attachment portion of the fourth support), more preferably encapsulates with continuity also said further electric power supplier.

BRIEF DESCRIPTION OF THE DRAWINGS

The features and the advantages of the present invention will be further clarified by the following detailed description of some embodiments, presented as non-limiting example of the present invention, with reference to the attached figures, in which:

FIGS. 4a and 4b schematically and respectively show a top view of the monitoring device of FIG. 3 and a section along the line 4b-4b of FIG. 4a;

FIG. 5 shows a schematic, perspective and partial view of a tyre section comprising a third embodiment of the monitoring device according to the present invention;

FIGS. 6a and 6b schematically and respectively show a top view of the monitoring device of FIG. 5 and a section along the line 6b-6b of FIG. 6a;

FIG. 7 shows a schematic top view of a fourth embodiment of the monitoring device according to the present invention;

DETAILED DESCRIPTION OF SOME EMBODIMENTS OF THE INVENTION

Figure 1:
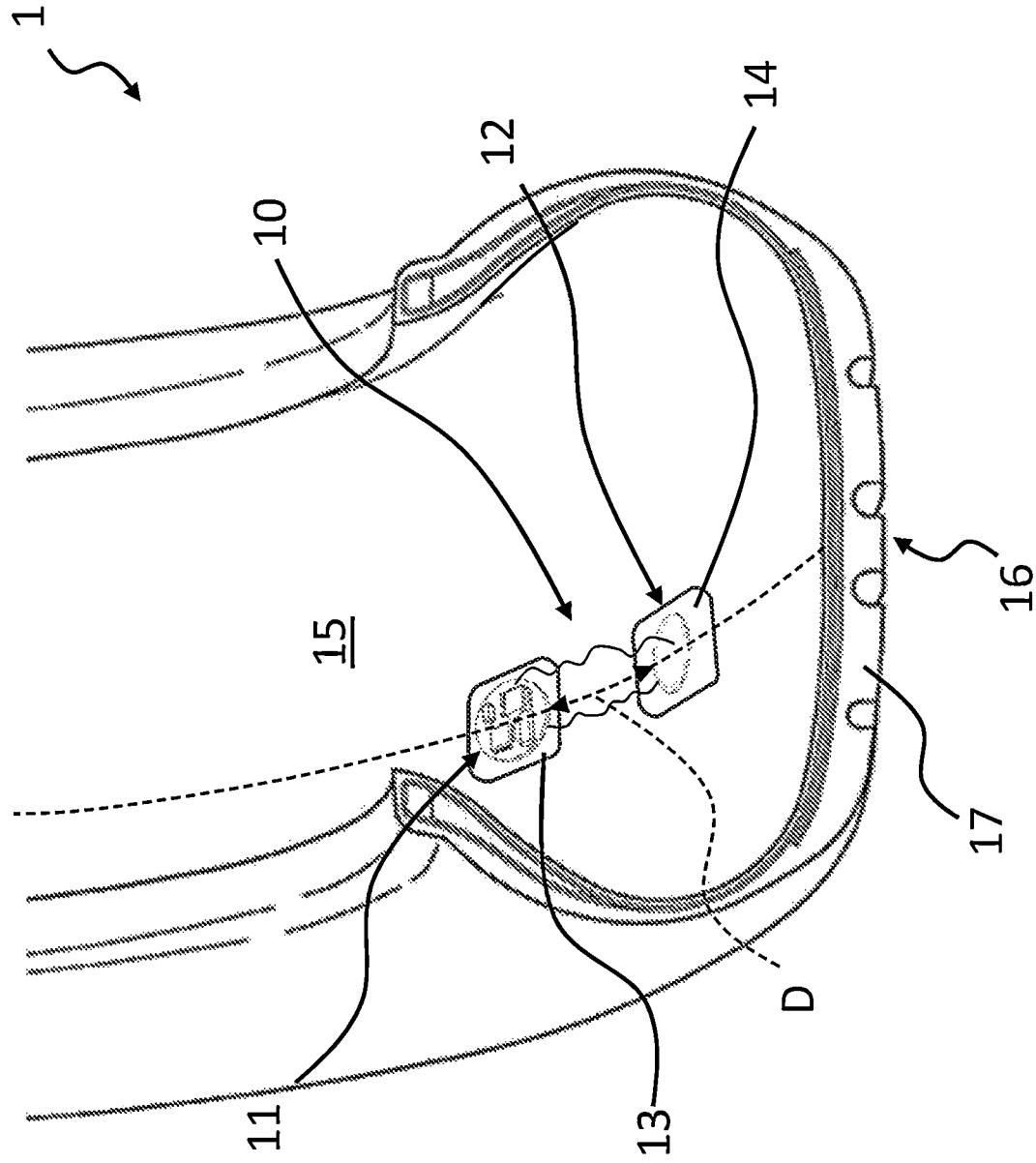
FIG. 1 shows a schematic, perspective and partial view of a tyre section comprising a first embodiment of the monitoring device according to the present invention.

In the figures with the reference number 1 it is shown a tyre (in partial perspective section) comprising a monitoring device 10 according to the present invention. In the present description and figures the same reference number is used for the same elements, also in their embodiments.

The monitoring device 10 comprises an electronic unit 11 and an electric power supplier 12.

The monitoring device 10 further comprises a first support 13 and a second support 14, by means of which the electronic unit 11 and the power supplier 12, respectively, are fixed on an inner surface 15 of the tyre 1 at a crown portion 16 of the tyre 1 (i.e. the portion of tyre at the tread band 17).

According to the present invention, the electronic unit 11 and the power supplier 12 are fixed to a mutual distance D having development on the inner surface 15 of the tyre 1.

The electronic unit 11 comprises a rigid printed circuits board 20 (Printed Circuit Board or PCB), on which are fixed (preferably on the same side of the board): at least one sensor 21 for detecting at least one of the following physical quantities: temperature, pressure, acceleration; a processing unit 22; a transceiver 23.

The monitoring device 10 comprises an electrical connection 30 for electrically connecting said electronic unit 11 (typically the sensor 21, the processing unit 22 and the transceiver 23) to said electric power supplier 12.

Exemplarily the rigid board 20 comprises (not shown) a laminated layer comprising one or more layers of woven fiberglass, impregnated with an epoxy resin, and electrically conductive metal tracks, wherein the sensor 21, the processing unit 22 and the transceiver 23 are fixed by welding on the metal tracks.

Exemplarily the rigid board has circular plan with diameter equal to about 20 mm. The distance D is exemplarily equal to 40 mm in the embodiment of FIG. 1, equal to 3 mm in the embodiment of FIG. 3-4a-4b and equal to 100 mm in the embodiment of FIG. 5-6a-6b.

In the embodiment of FIG. 1 the two separate elements 11 and 12 are distributed along the circumferential direction and they are substantially centred on the equatorial plane of the tyre 1. In other words, a straight line (not shown) passing through the centres of mass of the electronic unit 11 and of the power supplier 12 (considering the tyre undeformed) lies on the equatorial plane of the tyre (i.e. it forms a substantially null angle with said plane).

Figure 3:
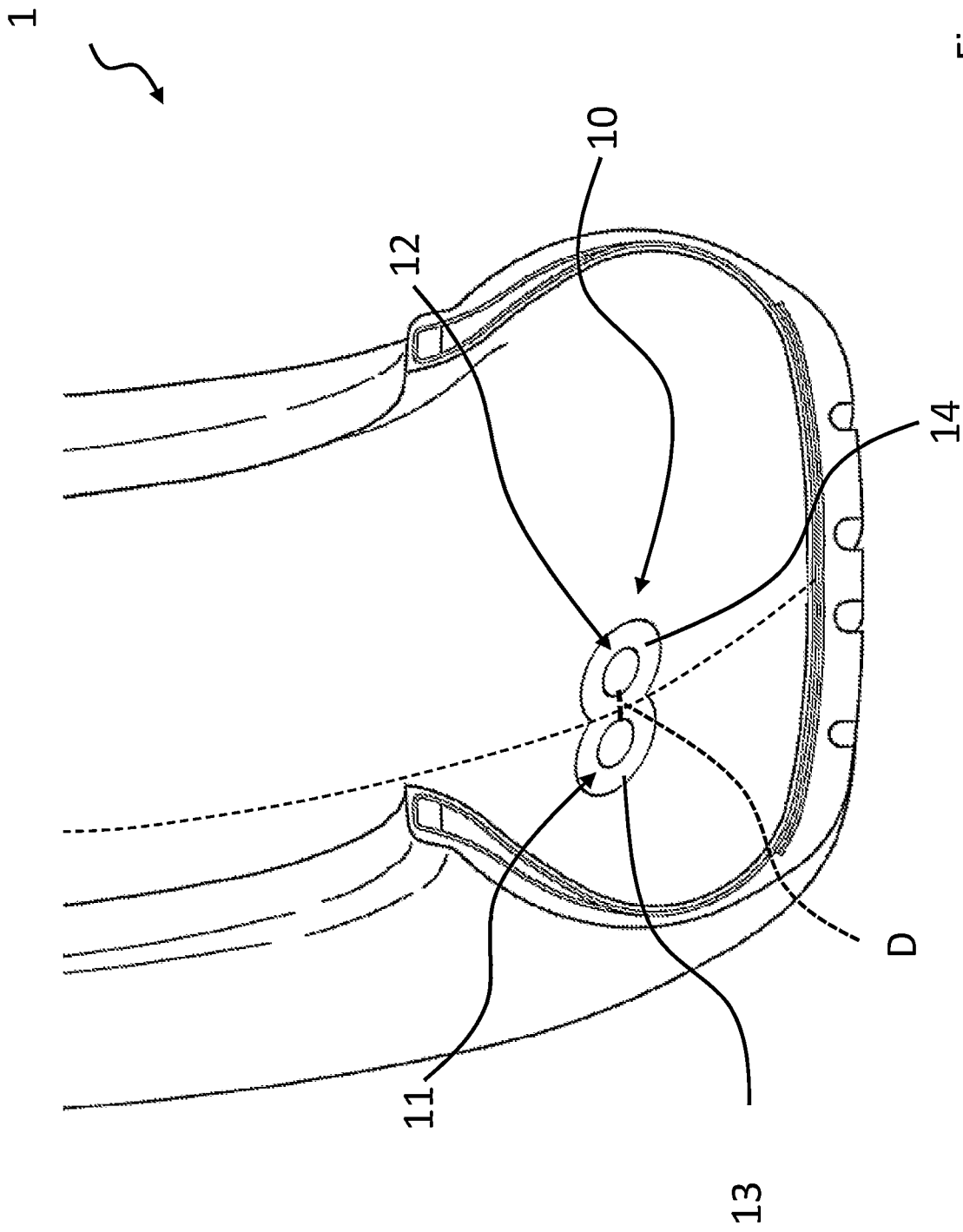
FIG. 3 shows a schematic, perspective and partial view of a tyre section comprising a second embodiment of the monitoring device according to the present invention.
Figure 8:
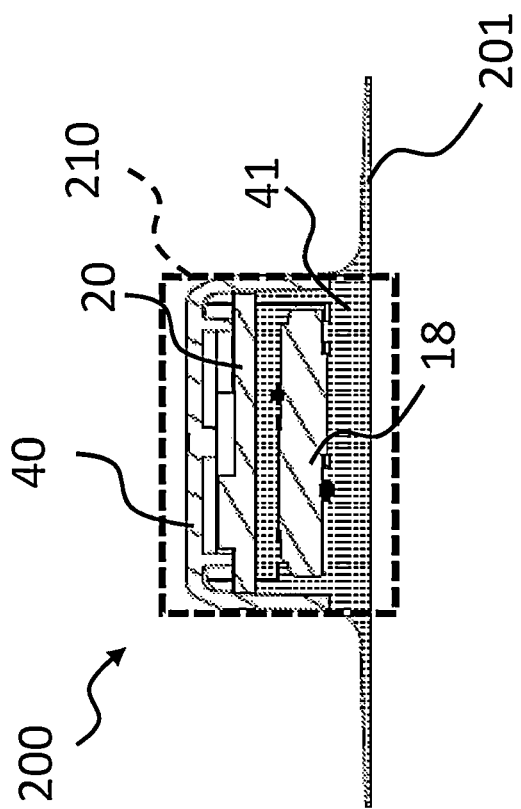
FIG. 8 shows a schematic sectional view of a comparative monitoring device.

In the embodiment of FIG. 3 the two separate elements 11 and 12 are substantially distributed along the axial direction, substantially symmetrically with respect to the equatorial plane of the tyre 1. In other words, a segment (not shown, substantially coinciding with the segment D shown in broken lines) passing through the centres of mass of the electronic unit 11 and of the electric power supplier 12 (considering the tyre undeformed) is substantially parallel to the axis of the tyre 1 and intersects the equatorial plane of the tyre 1 substantially at its median point.

In the embodiment of FIG. 5, the electronic unit 11 lies on the equatorial plane, while the electric power supplier 12 lies completely outside of the equatorial plane.

Exemplarily a straight line (not shown) passing through the centres of mass of the electronic unit and of the electric power supplier (on undeformed tyre) forms an angle equal to about 10° with the equatorial plane.

As an example, the sensor 21 can be a model sensor FXTH870911 DT1 marketed by NXP Semiconductors®, suitable for detecting all of the three physical quantities of temperature, pressure and acceleration, in particular at least the radial component and the tangential component of the acceleration. For this purpose, it is appropriate that the sensor 21 (and therefore the electronic unit 11 and/or the entire monitoring device 10) is fixed to the tyre with a precise spatial orientation with respect to the axis of the tyre.

The electric power supplier 12 can comprise a coin cell battery 18, for example of the type CR2032, with diameter of 20 mm and with thickness of 3.2 mm, with a mass equal to 3 g and an electric charge equal to 200 mAh.

Typically, the electrical connection 30 comprises two separate electric paths 31 and 32 (one for connection to the positive pole and one for connection to the negative pole of the battery 18), as shown in the figures.

Figure 2:
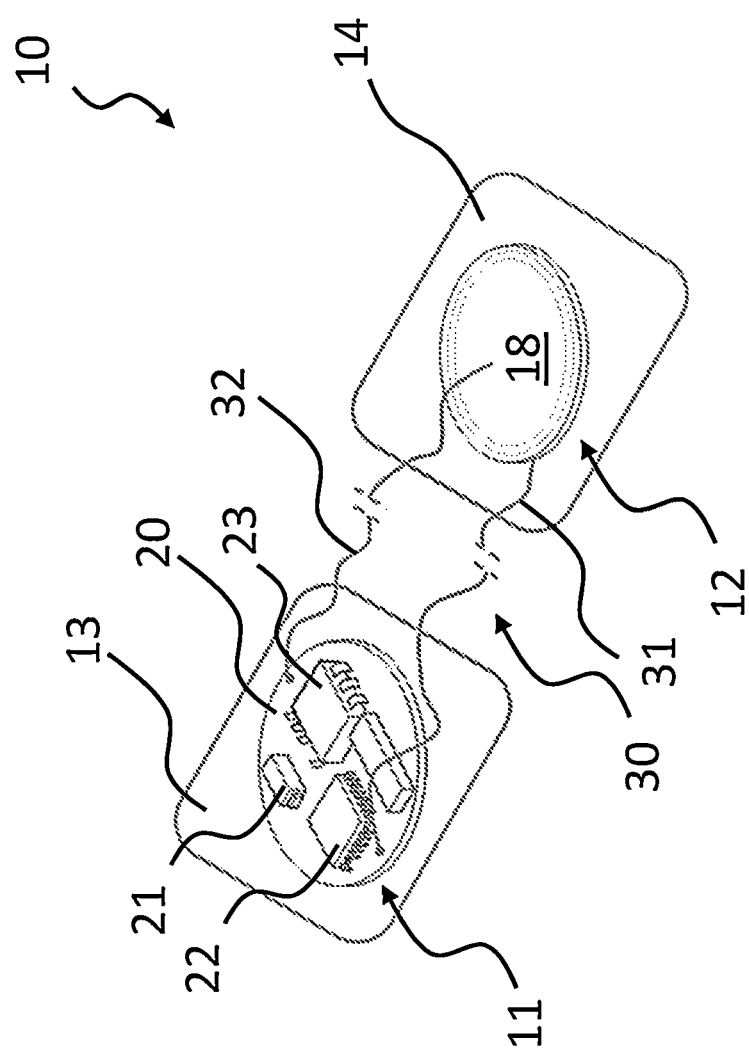
FIG. 2 shows a schematic perspective view of the monitoring device of FIG. 1 with some parts removed.

In the embodiment shown in FIG. 2, the first and second support 13 and 14 exemplarily comprise two distinct and separate attachment portions, flexible and substantially inextensible, for example in the form of pieces of elastomeric material possibly reinforced with textile and/or metallic filaments. Typically, an adhesive layer (e.g. acrylic PSA) keeps the attachment portions glued to the inner surface of the tyre. In this embodiment the electric paths 31 and 32 are insulated conductive wires. In the embodiments of the FIGS. 3, 4a, 4b, 5, 6a, 6b and 7, the electronic unit 11 comprises a rigid containment body 40 which completely houses the rigid board 20, the sensor 21, the processing unit 22 and the transceiver 23. Preferably a first side of the board on which all the active components 21, 22 and 23 are mounted, faces a bottom wall (in the figure the top wall) of the containment body and extends parallel to the bottom wall and for substantially the entire extension of the bottom wall.

Preferably an encapsulating material 41 (e.g. polyurethane) encapsulates, fixing it, the rigid board 20 inside the containment body. Preferably the encapsulating material 41 is located only on a second side of the board, opposite to the first side.

Advantageously in this way a gap between the board with its components and the bottom wall is left free to facilitate the receiving/transmitting of the signal and/or the monitoring of the pressure and/or of the temperature in the inner cavity of the tyre.

Preferably the first and second support 13 and 14 comprise respective attachment portions respectively of the containment body 40 (with the board 20 and the components) and of the electric power supplier 12 to the inner surface of the tyre.

Preferably the same encapsulating material 41 realizes in a single body and with continuity also the respective attachment portions of the first 13 and second support 14. Preferably the same encapsulating material 41 encapsulates with continuity also the battery 18 of the electric power supplier 12.

Preferably the same encapsulating material 41 realizes in a single body also a third support 50 for the electrical connection 30, in the form of a flexible substrate, on which lower surface (facing the inner surface of the tyre) the two electric paths 31 and 32 made with a conductive ink (for example with screen printing technologies typical of the printed electronics) are molded.

Preferably an adhesive layer (not shown), e.g. pressure sensitive (e.g., adhesive 468MP7c marketed by 3M®), is arranged to glue the lower face of the encapsulating material to the inner surface of the tyre.

Exemplarily, the electronic unit 11 has an overall weight equal to about 5 g and the electric power supplier 12 has an overall weight equal to about 3 g.

In the embodiment of FIG. 7, the monitoring device 10 comprises a further electric power supplier 60 and moreover a fourth support 61. The further electric power supplier 60 is fixed on the inner surface of the tyre at the crown portion through said fourth support 61 at a respective distance from the electronic unit 11 and from the electric power supplier 12. The monitoring device 10 therefore comprises a further electrical connection (not shown) for electrically connecting the electronic unit 11 with the further electric power supplier 60.

The further electric power supplier 60 can be the same or of the same type as the aforesaid electric power supplier 12. Preferably the encapsulating material 41 realizes with continuity also the fourth support 61 (in the form of a respective attachment portion of the further electric power supplier) and encapsulates with continuity the respective battery of the further electric power supplier.

The Applicant has determined the following relationship which binds the masses of the devices to the speeds:

$$v_1 = v_0 * \sqrt{m_0/m_1}$$

wherein $m_0$ and $m_1$ are the masses of two devices to be compared, applied to the inner surface of a tyre and $v_0$ and $v_1$ are the respective rotational speeds of the tyre to which the two devices to be compared develop the same maximum stresses in radial direction and in tangential direction (or of shear).

As an example, in the case wherein the overall mass of the monitoring device is divided according to the present invention so that half insists on the electronic unit and half insists on the electric power supplier, the 'critical' speed at which the radial and/or the tangential stresses can induce a break of at least one of the two parts (electronic unit or electric power supplier) of the monitoring device is increased by about 1.4 times.

It is observed that while the shear stress can also be reduced by its distribution by means of an inextensible and sufficiently large attachment portion, the stress in the radial direction is not affected by such a solution. The present invention is instead able to reduce both the stresses (as a first approximation in equal measure, due to the proportionality that links them, as empirically determined by the Applicant).

Therefore, the present invention allows to preserve the structural and functional integrity of the monitoring device and of the tyre up to extreme speeds.

The invention claimed is:

1. A tyre comprising a monitoring device, wherein the monitoring device comprises:
    an electronic unit,
    an electric power supplier,
    a first support and
    a second support,
    wherein the electronic unit and the electric power supplier are both fixed on an inner surface of the tyre at a crown portion of the tyre through respectively the first and second support,
    wherein the electronic unit comprises a rigid printed circuit board; at least one sensor for detecting one or more of the following physical quantities: temperature, pressure, and acceleration; a processing unit; and a transceiver, and the at least one sensor, the processing unit, and the transceiver are fixed on the rigid board, and
    wherein the monitoring device further comprises an electrical connection for electrically connecting the electronic unit to the electric power supplier.

2. The tyre according to claim 1, wherein the rigid board is inscribed in a circle with a diameter less than or equal to 50 mm; the rigid board comprises a laminated layer comprising one or more layers of a core material impregnated with a resin and electrically conductive metal tracks; and the at least one sensor, the processing unit, and the transceiver are fixed by welding on the metal tracks.

3. The tyre according to claim 1, wherein a distance (D) between the electronic unit and the electric power supplier is greater than or equal to 30 mm and less than or equal to 250 mm.

4. The tyre according to claim 1, wherein an equatorial plane of the tyre intersects the first support.

5. The tyre according to claim 1, wherein a straight line passing through the centres of mass of the electronic unit and of the electric power supplier intersects a direction parallel to an equatorial plane of the tyre with an angle less than, or equal to, 10°.

6. The tyre according to claim 1, wherein a straight line passing through the centres of mass of the electronic unit and of the electric power supplier intersects a direction parallel to an equatorial plane of the tyre with an angle greater than or equal to 5°.

7. The tyre according to claim 1, wherein the at least one sensor detects all three of the following physical quantities: temperature, pressure, and acceleration; and the at least one sensor detects at least a radial component or a tangential component of the acceleration.

8. The tyre according to claim 1, wherein the electric power supplier is an electric energy accumulator, and the electrical connection comprises at least two separate electric paths.

9. The tyre according to claim 1, wherein the monitoring device further comprises a third support through which the electrical connection is fixed on the inner surface of the tyre at the crown portion; the third support comprises a flexible substrate; and an overall development of the third support or of the electrical connection, from the electronic unit to the electric power supplier, is greater than a mutual distance (D) between the electronic unit and the electric power supplier.

10. The tyre according to claim 9, wherein the electrical connection is made by a conductive ink deposited on a surface of the flexible substrate facing the inner surface of the tyre.

11. The tyre according to claim 9, wherein the third support comprises an adhesive layer interposed between the inner surface of the tyre and the substrate, and the electrical connection is interposed between the adhesive layer and the substrate.

12. The tyre according to claim 1, wherein the first support or the second support comprise an adhesive layer.

13. The tyre according to claim 1, wherein the first support and the second support comprise a respective attachment portion, flexible and substantially inextensible, and a respective adhesive layer which keeps each attachment portion glued to the inner surface of the tyre; and the attachment portion is chosen from a piece of elastomeric material reinforced with textile or metallic filaments, a film of plastic material, and a polyurethane layer.

14. The tyre according to claim 1, wherein the electronic unit comprises a containment body partially housing the board, the at least one sensor, the processing unit, and the transceiver.

15. The tyre according to claim 1, wherein the electronic unit is encapsulated by an encapsulating material.

16. The tyre according to claim 15, wherein the at least one sensor, the processing unit, and the transceiver are all fixed on a first side of the board; the first side of the board faces a bottom wall of the containment body; and the encapsulating material is only localized on a second side of the board, opposite to the first side.

17. The tyre according to claim 1, wherein the electric power supplier is encapsulated by an encapsulating material with continuity.

18. The tyre according to claim 15, wherein the encapsulating material is a polyurethane or a polyurea material.

19. The tyre according to claim 15, wherein the encapsulating material realizes the first and second support in continuity with the material encapsulating the electronic unit.

20. The tyre according to claim 19, wherein the encapsulating material also realizes the substrate of the third support in a single body.

21. The tyre according to claim 1, wherein the monitoring device comprises at least one further electric power supplier and a fourth support; the further electric power supplier is fixed on the inner surface of the tyre at the crown portion through the fourth support; the fourth support is placed at a respective distance from the first and second support, having development on the inner surface of the tyre; and the monitoring device comprises a further electrical connection for electrically connecting the electronic unit with the further electric power supplier.

22. The tyre according to claim 17, wherein the encapsulating material realizes the first and second support in continuity with the material encapsulating the electric power supplier.

23. The tyre according to claim 1, wherein the electronic unit and the electric power supplier are encapsulated by an encapsulating material that realizes the first and second support with continuity.

* * * * *